United States Patent [19]

Earl

[11] Patent Number: 4,462,560
[45] Date of Patent: Jul. 31, 1984

[54] AIRPLANE TAKE-OFF SYSTEM

[75] Inventor: T. Desmond Earl, Buffalo, N.Y.

[73] Assignee: The United States of America as represented by the Secretary of the Air Force, Washington, D.C.

[21] Appl. No.: 341,459

[22] Filed: Jan. 26, 1982

[51] Int. Cl.³ .............................................. B64F 1/10
[52] U.S. Cl. .................................... 244/63; 244/2; 244/23 R; 244/110 E; 180/116; 180/120
[58] Field of Search .............. 244/12.1, 23 R, 12.3, 244/23 B, 100 R, 100 A, 63, 2, 115, 116, 114 R, 101, 110 E; 180/116, 117, 120

[56] References Cited

U.S. PATENT DOCUMENTS

| | | | |
|---|---|---|---|
| 1,825,592 | 9/1931 | Johnson | 244/2 |
| 3,174,573 | 3/1965 | Chaplin | 244/23 R |
| 3,275,270 | 9/1966 | Earl et al. | 244/110 E |
| 3,861,491 | 1/1975 | Ferguson | 180/120 |
| 3,963,193 | 6/1976 | Walker | 244/63 |
| 4,056,159 | 11/1977 | Evans | 180/120 |
| 4,266,742 | 5/1981 | Perez et al. | 244/63 |

FOREIGN PATENT DOCUMENTS

| | | | |
|---|---|---|---|
| 835594 | 12/1938 | France | 244/63 |
| 568570 | 4/1945 | United Kingdom | 244/63 |
| 895341 | 5/1962 | United Kingdom | 244/114 R |
| 926613 | 5/1963 | United Kingdom | 244/2 |

Primary Examiner—Galen L. Barefoot
Attorney, Agent, or Firm—Donald J. Singer; John R. Flanagan

[57] ABSTRACT

This invention provides a system for launching aircraft into free flight regime regardless of runway conditions, wherein a sled of the self-powered air cushion vehicle type is configured in plan form so as to accept in temporarily locked relation thereupon and in combination therewith an airplane in such manner that a successful take-off run in mutually aerodynamically compatible regime may be accomplished in spite of surface problems with the runway. Upon attainment of airborne speed, under control of the pilot the aircraft lifts off the sled into full free flight; and thus is airborne albeit the runway is at the time unusable by conventional wheel-geared aircraft; for example, as the result of a previous bombing attack on the runway by enemy aircraft. The sled incorporates self-propelling and directional guidance means for retrieval/reuse purposes, as well as a take-off abort control system.

1 Claim, 16 Drawing Figures

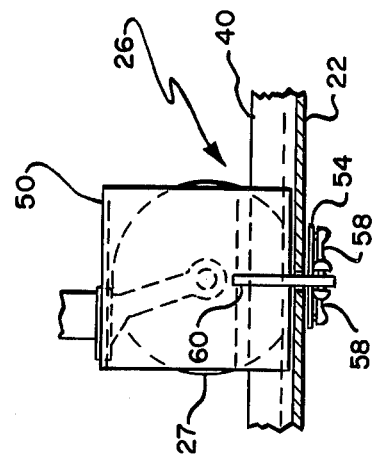
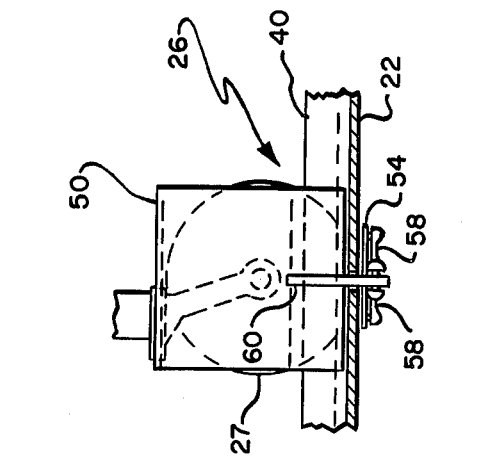
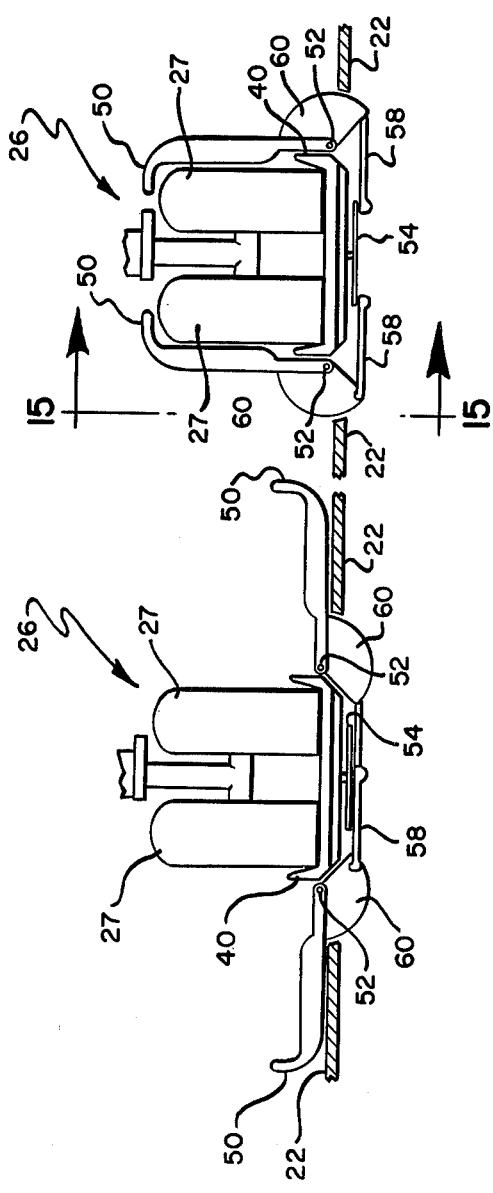
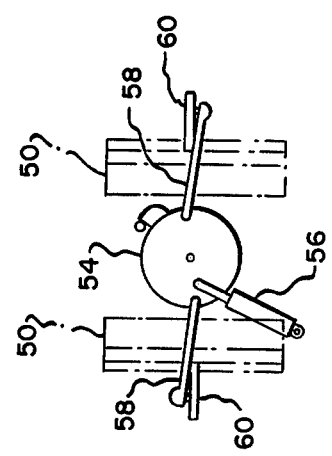
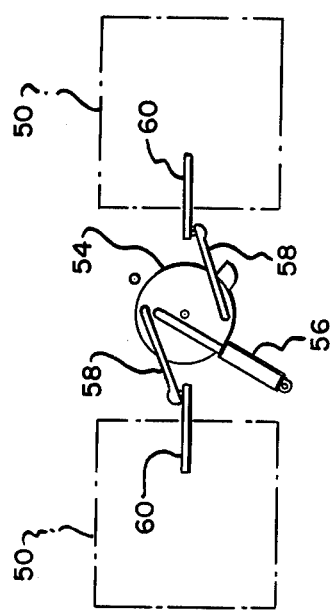

AIRPLANE TAKE-OFF SYSTEM

BACKGROUND AND BRIEF SUMMARY OF THE INVENTION

This invention has for its primary purpose to provide means whereby, whenever a conventionally wheel-geared type airplane is unable to take off from a runway because of its temporarily surface-disrupted condition, the airplane may nevertheless be successfully launched into airborne regime. Thus, rescue/recovery missions, as well as military attack retaliation operations, will be immediately feasible, although the only available airstrip (whether ground-based or on a carrier deck) may be temporarily unusuable by wheel-geared aircraft per se.

According to this invention, an air cushion supportable type sled of unique characteristics is provided, whereby for example an airstrip such as has suffered a bombing attack or the like preventing immediate viable use of its runway by wheel-based aircraft may nevertheless be immediately used thereafter to launch defense tactical fighter aircraft in retaliation. Each such aircraft is individually ramp-mounted and temporarily locked upon such a sled; and each sled-aircraft combination is then air cushion-elevated by means of pressured air supply means carried by the sled. The sled-aircraft combination is then powered by the aircraft engine(s) into aircraft take-off run regime without handicap by the roughness of the damaged runway. Therefore, the airplane component of this novel combination is accordingly provided with an overreaching facility to perform its mission when other aircraft of identical type would be obliged to stand by, helpless to perform.

As further disclosed, additional take-off assist means such as rocket engines may be carried by the sled. Means are provided for temporarily holding the aircraft securely to the sled so as to be in mutually aerodynamically stable condition throughout the take-off run; and pilot controllable means are provided for releasing the aircraft to rise free of the sled upon attainment of aircraft flying speed. Furthermore, means are provided for minimizing the run of the sled after separation and for recycling it to the air base facility, as well as take-off abort means such as would be useful if and whenever such maneuvers are required. Following aircraft separation from the sled, the excess air cushion supply of pressurized air then available from the sled-mounted engine blower is utilized to directionally control the sled retrieval operation.

Preferred embodiments of the invention are illustrated herewith, wherein:

BRIEF DESCRIPTION OF THE DRAWINGS

FIGS. 11 and 12 are front elevational views illustrating, respectively, the aircraft nose wheel restraint mechanism in open and closed positions;

FIGS. 13 and 14 are bottom plan views of the nose wheel restraint cover operating mechanism as shown in FIGS. 10 and 11, respectively;

FIG. 15 is a fragmentary side elevational view of FIG. 12; and

Figure 1:
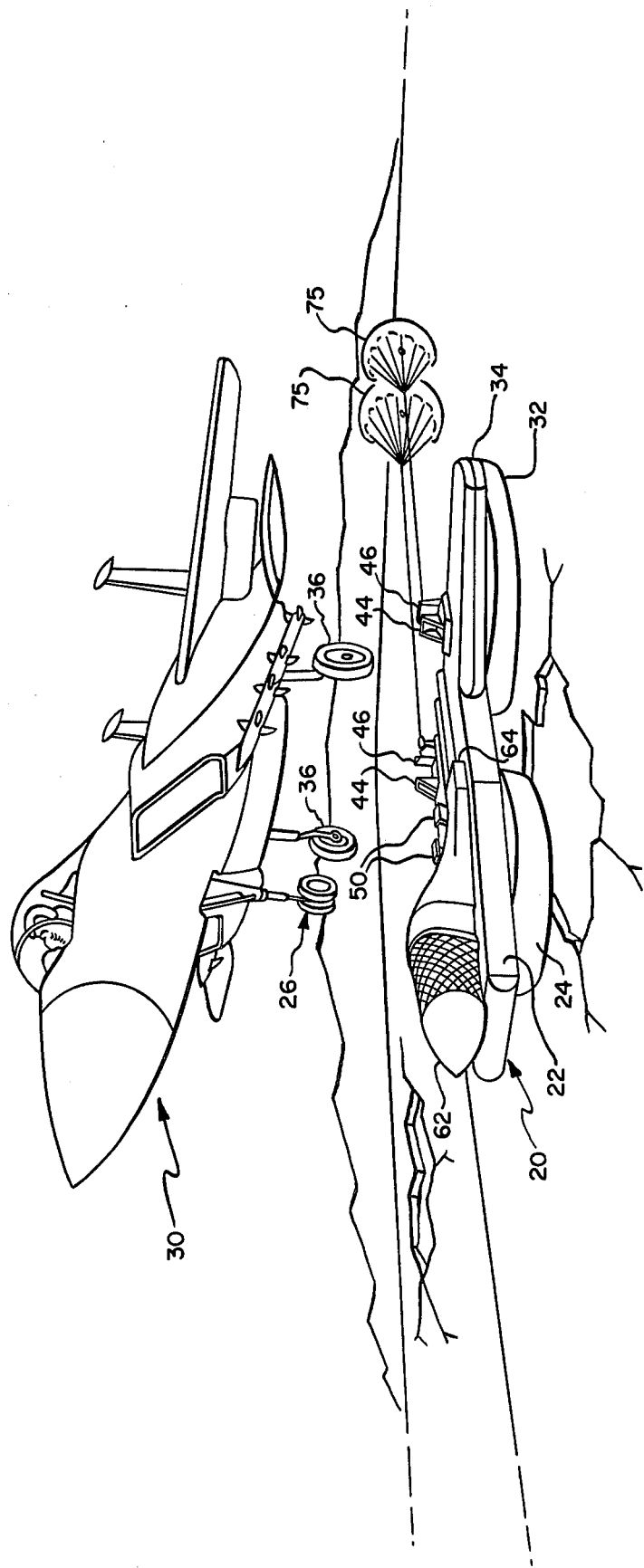
FIG. 1 pictorially illustrates an airplane as it rises from a sled device of this invention after traveling over a previously bomb-cratered runway; the sled drag chutes thereof being deployed.
Figure 2:
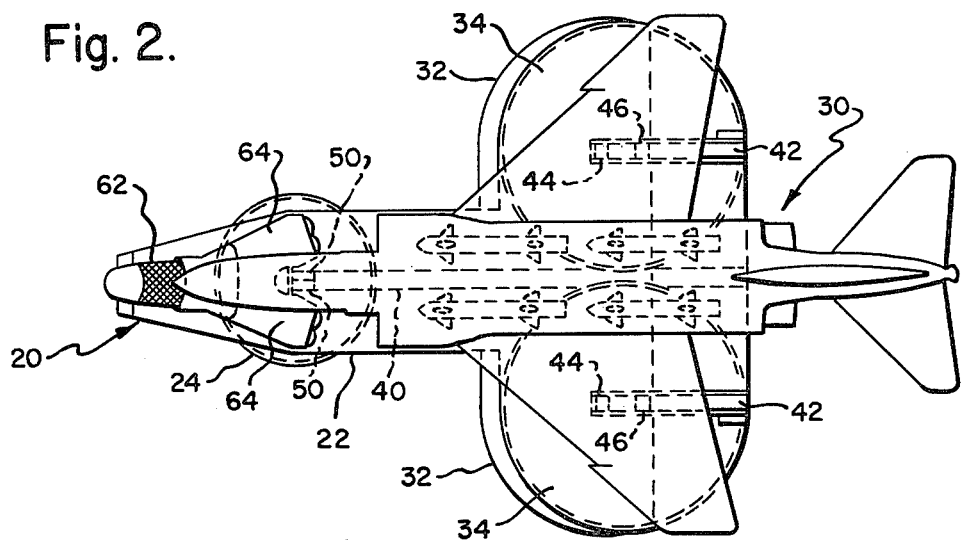
FIG. 2 is a top plan view showing how the aircraft is mounted upon the air cushion support sled in accordance with the invention.

As shown in the drawing herewith, a preferred embodiment of the invention may be provided in the form of an air cushion vehicle such as is designated generally at 20. As shown, the ACV is of the tri-cell plenum-skirted type, comprising a main hull structure 22 subtended by a trio of flexible skirted cells or so-called "jupes" arranged in plan view in a "tricycle" configuration. The forwardly disposed cell 24 is located relative to the hull 22 so as to be approximately centered beneath the nose wheel unit 26 (which in this example comprises a pair of wheels 27—27) of the aircraft 30 which is to be accommodated thereon. The rearwardly disposed air cushion cells 32—32 of the sled are mounted under corresponding laterally extending portions 34—34 of the hull structure 22, and the air cushion cells 32—32 are in plan view approximately centered under the positions of the rear wheels 36—36 of the aircraft 30 when it is mounted thereon. Thus, it will be appreciated that the plan view configuration of the sled 20 and the locaton thereunder of the air cushion cells 24,32,32 are in each case to be tailored to be approximately congruent to the tricycle landing wheel system format of the aircraft 30 for which the sled is designed.

Figure 3:
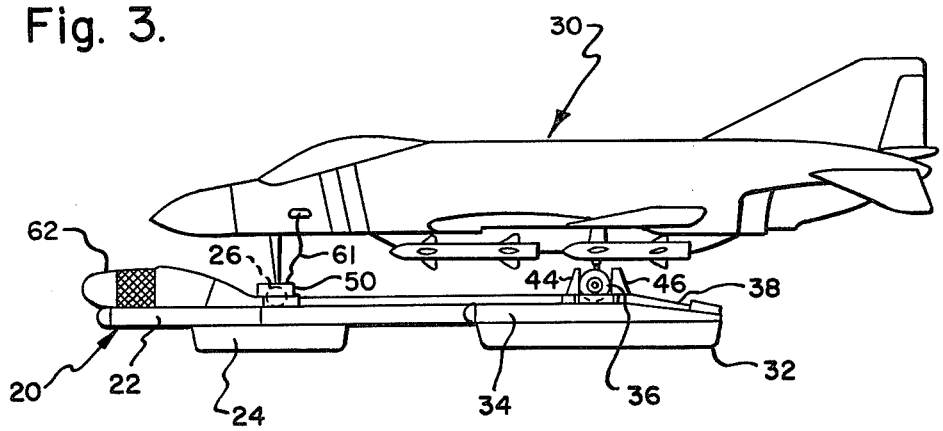
FIGS. 3 and 4 are side elevational and front elevational views, respectively, of the arrangement of FIG. 2.
Figure 4:
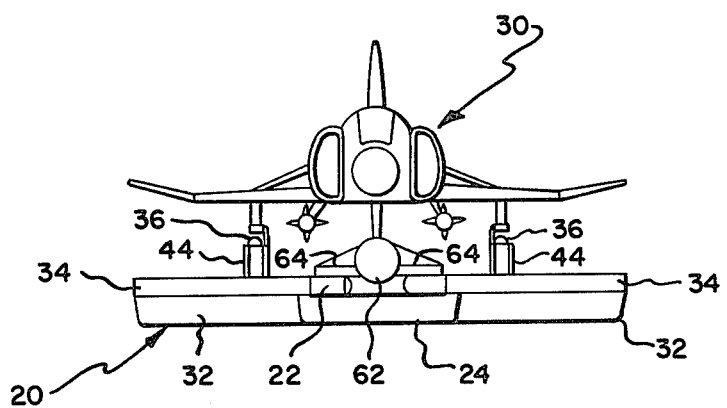
Figure 5:
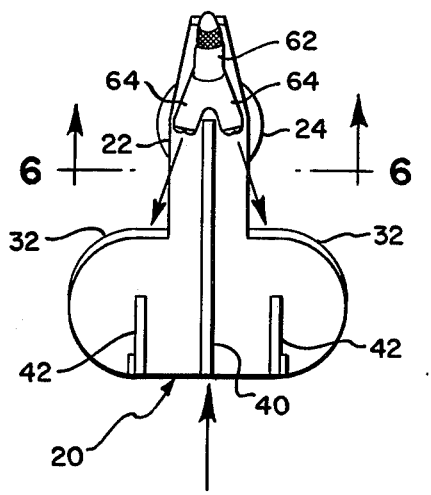
FIG. 5 is a plan view of the air cushion sled when driving straight ahead after aircraft separation.
Figure 6:
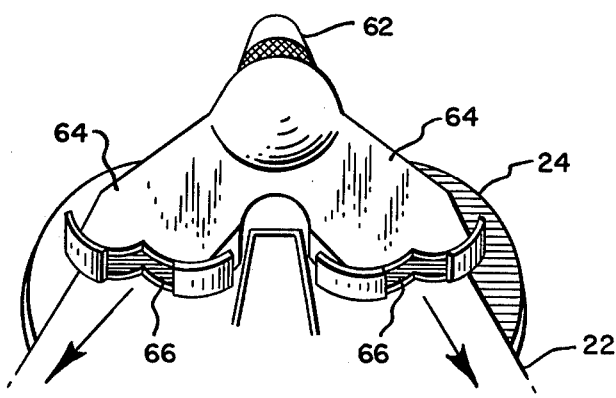
FIG. 6 is a fragmentary top-rear perspective view showing the air cushion blower jet thrust settings thereof being adjusted to drive the sled straight ahead.
Figure 10:
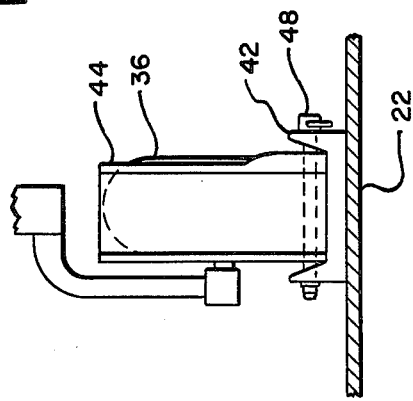
FIGS. 9 and 10 are side and front elevational views, respectively, of the aircraft main wheel chocking arrangements.
Figure 9:
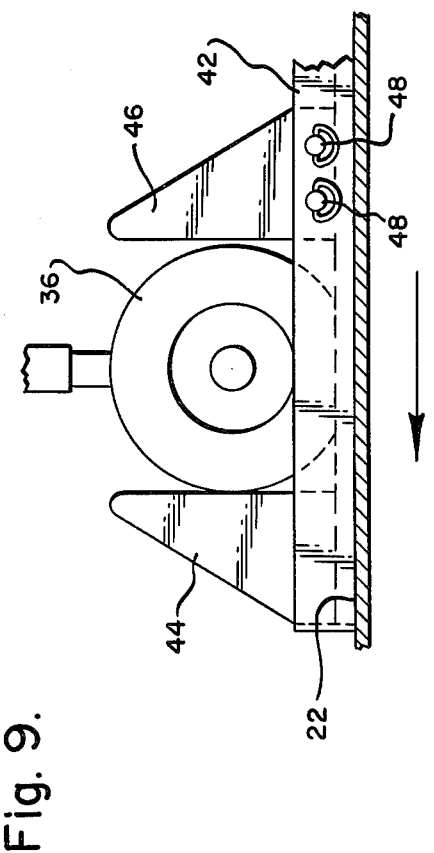

As best shown at FIG. 3, the rear end top surface portion of the hull 22 is downwardly inclined as shown at 38 so as to provide a ramp upon which the aircraft 30 may climb or be pulled up into such position that the landing wheel units 26,36,36 thereof reside approximately centered over the cells 24,32,32 as explained hereinabove. As shown at FIGS. 5 and 6, the hull 22 includes on its upper surface a centrally disposed trackway 40 running longitudinally of the hull through which the nose wheel unit 26 of the aircraft is guided to roll while moving into position on the sled; and a pair of laterally spaced apart trackways 42—42 are provided through which the rear wheels 36—36 of the aircraft are guided to roll until the aircraft assumes its proper position on the sled. As shown at FIGS. 9 and 10, the rear trackways 42—42 are provided with chocks 44—44 located just ahead of the positions of the aircraft wheels 36—36 when they are properly settled on the sled. Rear chocks 46—46 are then manually set up by the ground crew in the trackway behind the positions of the rear wheels, such as by means of lock pins 48.

Means are provided as shown in FIGS. 11-15 in association with the nose wheel trackway 40 for temporarily locking the nose wheel unit 26 against rising out of the trackway until such time as the aircraft pilot, upon reaching aircraft flight speed, operates a control device such as to liberate the nose wheel of the aircraft to lift up and separate from the sled into an increased angle of attack attitude. As shown herein, this mechanism may comprise a pair of clamshell-like cover members 50—50 which are hingedly mounted as indicated at 52 upon the sled hull structure 22, so as to be pivotable upwardly and over the nose wheels 27—27. Suitable mechanism for folding/unfolding the covers 50—50 relative to the nose wheel unit may comprise as shown herein a rotatable member 54 under control of the aircraft pilot by means of a linear actuator 56. The member 54 is arranged to drive a pair of struts 58—58 extending in opposite directions therefrom into pivotal connections with bell crank members 60—60 extending rigidly from the oppositely disposed cover members 50—50. By reference to the illustrations at FIGS. 11-15, it will be readily apparent that the clamshell-like cover arrangement for the aircraft nose wheel unit 26 may be thereby operated by any appropriate control system under control of the aircraft pilot as by way of a detachable electrical control cable as is shown at 61, FIG. 3.

Figure 7:
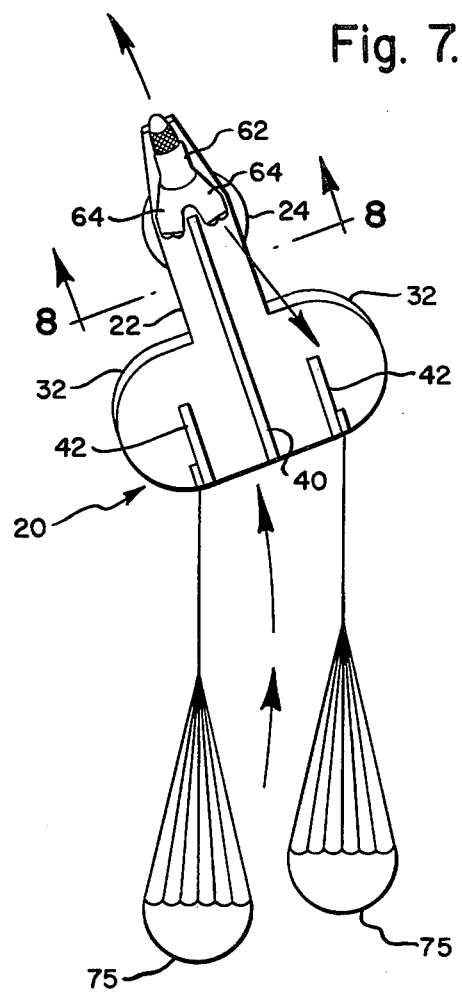
FIG. 7 is a plan view of the sled when in a directional turn for retrieval purposes subsequent to aircraft separation with its drag chutes in operation.
Figure 8:
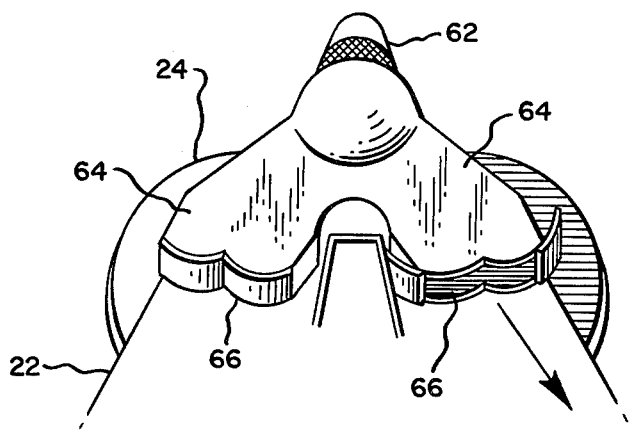
FIG. 8 is a fragmentary top-rear perspective view of the sled showing the air cushion blower jet thrust settings when adjusted to drive the sled into a directional turn as shown at FIG. 7.

As illustrated herein, the air cushion sled 20 mounts an engine such as a fan-jet engine as shown at 62; the output of which is employed to drive a blower furnishing pressurized air to the air cushion cells 24,32,32 through interconnecting ducts incorporated within the hull structure. A by-pass duct system comprising rearwardly divergent nozzles 64—64 as best shown at FIGS. 6 and 8, is also provided; and are equipped with discharge control valves 66—66. Thus, for straight ahead propulsion of the sled following aircraft separation, both of the nozzle valves are adjusted into their fully open positions as illustrated for example at FIGS. 5 and 6. However, for directional turn purposes, such as is illustrated at FIGS. 7 and 8, the valve device controlling one nozzle or the other is partially or totally closed, whereupon the output thrust of the engine 62 will be concentrated through the still open jet nozzle.

Figure 16:
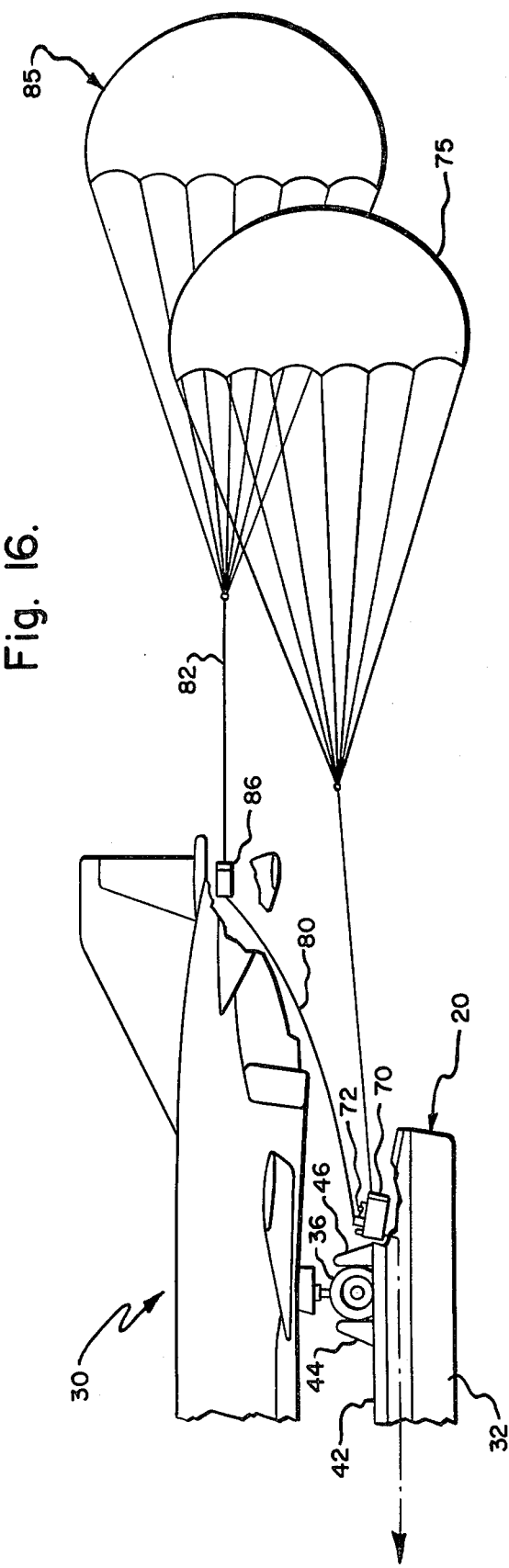
FIG. 16 is a side elevational view illustrating how the sled and aircraft drag chutes may be simultaneously deployed such as for take-off run abort purposes.

As shown at FIGS. 1 and 16, the sled 20 is also preferably equipped with drag chutes such as may be initially contained within housings as shown at 70. Under control of mechanisms such as are indicated at 72 operation of the chutes may be optionally triggered by switch means acting automatically upon lift-off of the aircraft from the sled, whereby the chutes as illustrated at 75 will be deployed. Means will also be provided whereby simultaneously with this procedure the throttle control of the sled engine 62 is automatically shut off and one of the engine jet nozzle valves is closed, so as to coast the sled into a directional turn, off and away from the runway for recycling and so as to clear the airstrip for other operational use. The control mechanism 72 is actuated by a lanyard 80 connected to the drag line 82 of the aircraft drag chute 85; whereby, upon actuation of the control means 86 for deployment of the aircraft drag chute (for take-off abort purposes) the sled chutes will also be deployed.

What is claimed is:

1. An air cushion vehicle sled for allowing an aircraft to take-off from a damaged runway, said sled comprising:

a hull having a generally T-shaped configuration in plan view to present a relatively narrow forward portion and laterally projecting rearward portions;

a forward air cushion cell carried by said hull below said forward portion and having a diameter substantially corresponding to the width of said forward portion of said hull;

a pair of substantially identical rearward air cushion cells carried by said hull below said rearward portions thereof, said rearward cells being disposed in closely spaced, side-by-side relation and each having a diameter substantially greater than the diameter of said forward cell and sufficient to extend to the outer end of said rearward portion of said hull, said forward and rearward cells being relatively disposed such that the three wheels of a tricycle landing gear aircraft are adapted to be substantially centered over the respective cells when said aircraft is supported on said hull;

retaining means on said hull centered above each of said cells for releasably holding the three wheels of the tricycle landing gear aircraft;

mutually aligned wheel guide track means disposed of said hull and aligned with each of said retaining means for accommodating the wheels of the aircraft when mounting the sled and guiding the wheels into positions over said air cushion cells and adjacent said each retaining means;

means located at the forward end of said forward portion of the hull for delivering pressurized air into said cells and including rearwardly directed and divergent nozzles located to either side of that retaining means centered above said forward cell, each nozzle having independently operable closure means for constraining the pressurized air to be fed to said cells when the closure means is closed and for by-passing flow of air to said cells and allowing it to pass through the nozzle when the closure means is open for use in directional control of the travel of said sled following aricraft separation;

drag chute means carried adjacent the rear end of said rearward portion of the hull and normally stowed in housings mounted thereon, said chutes being releasably actuated automatically upon separation of said aircraft from said sled for retarding further travels of said sled; and means adapted to be controlled by aircraft personnel for releasing said retaining means to permit said aircraft to fly away from said sled.

* * * * *